(12) United States Patent
Hunter et al.

(10) Patent No.: US 11,954,303 B2
(45) Date of Patent: Apr. 9, 2024

(54) EPHEMERAL NAVIGATION BAR

(71) Applicant: Apple Inc., Cupertino, CA (US)

(72) Inventors: Kim Hunter, Sunnyvale, CA (US); Pavel Cisler, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/739,073

(22) Filed: May 6, 2022

(65) Prior Publication Data

US 2022/0365637 A1 Nov. 17, 2022

Related U.S. Application Data

(60) Provisional application No. 63/189,667, filed on May 17, 2021.

(51) Int. Cl.
*G06F 3/0482* (2013.01)
*G06F 9/451* (2018.01)
*G06F 16/22* (2019.01)

(52) U.S. Cl.
CPC ............ *G06F 3/0482* (2013.01); *G06F 9/451* (2018.02); *G06F 16/2246* (2019.01)

(58) Field of Classification Search
CPC ..... G06F 3/0482; G06F 9/451; G06F 16/2246
See application file for complete search history.

(56) References Cited

U.S. PATENT DOCUMENTS

| | | | |
|---|---|---|---|
| 2006/0036568 A1* | 2/2006 | Moore | G06F 16/168 |
| 2012/0304111 A1* | 11/2012 | Queru | G06F 3/0482 |
| | | | 715/781 |
| 2015/0082251 A1* | 3/2015 | Lam | G06F 16/955 |
| | | | 715/843 |
| 2017/0052671 A1* | 2/2017 | Grigorov | G06F 3/0482 |

* cited by examiner

*Primary Examiner* — Tadesse Hailu
*Assistant Examiner* — Darrin Hope
(74) *Attorney, Agent, or Firm* — BAKERHOSTETLER

(57) ABSTRACT

The subject technology displays an application window showing first contents of a given level of a hierarchical content structure associated with an electronic device. Upon receiving a first user input, a navigation bar is displayed. The navigation bar displays a path including levels for arriving at the first contents within the hierarchical content structure. The displayed path is determined based on metadata associated with contents displayed in the application window. Responsive to a user selection of one of the items of the hierarchical content structure displayed in the navigation bar, content items displayed in the application window are changed.

20 Claims, 10 Drawing Sheets

EPHEMERAL NAVIGATION BAR

CROSS-REFERENCE TO RELATED APPLICATIONS

The present application claims the benefit of priority to U.S. Provisional Patent Application Ser. No. 63/189,667, entitled "Ephemeral Navigation Bar," filed May 17, 2021, which is hereby incorporated by reference in its entirety for all purposes.

TECHNICAL FIELD

The present description relates generally to display of a hierarchical content structure, such as display of a file folder structure accessed by an electronic device.

BACKGROUND

Electronic devices such as laptops, tablet devices, and smartphones often store or organize data in a hierarchical content structure such as, for example, a folder structure for categorizing and/or organizing data files. Electronic devices also include user interfaces (UIs) with application windows for showing contents associated with the electronic devices. The stored or organized data associated with a given electronic device can be accessed by navigating through the hierarchical content structure via the UI.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

File-manager applications can provide a file-manager UI view, also referred to herein as the application window, for viewing the contents of various levels of a hierarchical content structure, such as a filesystem, including lists or icons representing files stored in the memory of the electronic device or on a server accessible via the electronic device and organized using a hierarchical content structure. The file-manager UI view may include navigation options for inputting, selecting and/or finding a desired level within the hierarchical content structure. When the file-manager UI view is displayed, files can be dragged and dropped into or out of a displayed level of the hierarchical content structure. In some implementations, the file-manager UI may include a navigation bar displaying at path within the hierarchical content structure for arriving at the contents displayed in the file-manager UI. In some scenarios, it may be desirable to display metadata associated with a selected content item displayed in the file-manager UI in the navigation bar.

Figure 1:
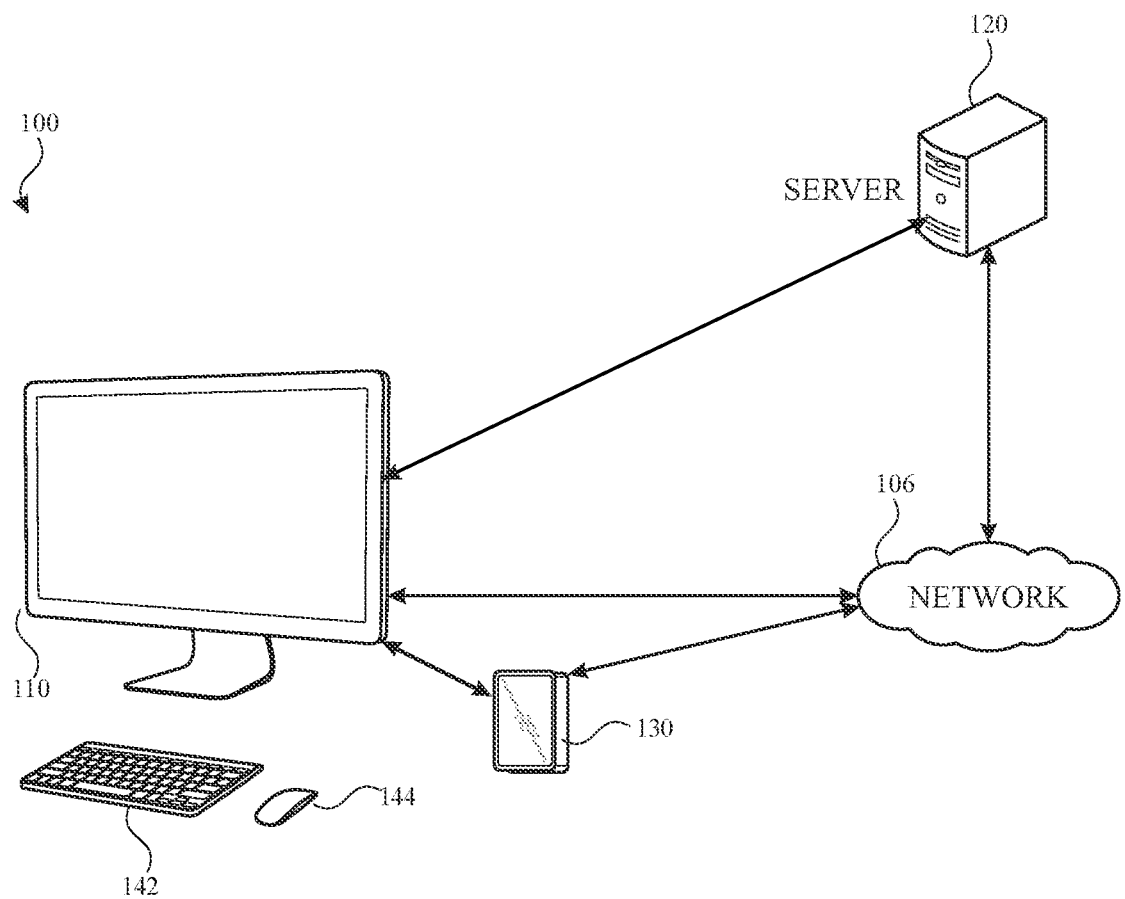
FIG. 1 illustrates an example network environment in which direct input from remote devices may be implemented in accordance with one or more implementations.

FIG. 1 illustrates an example network environment 100 in which direct input of data or content to a first device from a second device may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, a server 120, and an electronic device 130. The network 106 may communicatively (directly or indirectly) couple the electronic device 110 and/or the server 120, the electronic device 130 and/or the server 120, the electronic device 110 and/or the electronic device 130. In one or more implementations, the network 106 may be an interconnected network of devices that may include, or may be communicatively coupled to, the Internet. For explanatory purposes, the network environment 100 is illustrated in FIG. 1 as including an electronic device 110, an electronic device 130, an and a server 120; however, the network environment 100 may include any number of electronic devices and any number of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed herein with respect to FIG. 9. In one or more implementations, the electronic device 110 may include one or more input devices such as, for example, a keyboard 142 and a mouse 144. The electronic device 110 may also provide an application such as a file manager application configured to access hierarchical content structures of electronic device 110, electronic device 130 and/or the server 120 (e.g., directly over a wired or wireless peer-to-peer connection or over the network 106 with electronic device 130, and/or server 120).

The electronic device 130 may include a touchscreen, a camera, a microphone and/or other components and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. The electronic device 130, may further include motion sensors such as gyroscopes, accelerometers, global positioning system (GPS) components, magnetic sensors such as compasses, and the like, and may be, for example, a smart phone or media player device. Additionally, the electronic device 130 includes a memory on which data can be stored. In one or more implementations, the data is stored in a hierarchical content structure that is same as, similar to or different from the hierarchical content structure of the electronic device 110.

In one or more implementations, the electronic device 130 may couple to other input devices such as a keyboard or a mouse via a wired or a wireless connection. In such implementations, the keyboard and/or the mouse may enable a user to access data stored on the memory of the electronic device 130 by allowing the user to access and/or navigate through the hierarchical content structure of the electronic device 130.

In FIG. 1, by way of example, the electronic device 130 is depicted as a smartphone with a touchscreen. In one or more implementations, the electronic device 130 may be, and/or may include all or part of the electronic system discussed below with respect to FIG. 9. The electronic device 110 may also provide an application such as a file manager application configured to access hierarchical content structures of electronic device 130, electronic device 110 and/or the server 120 (e.g., directly over a wired or wireless peer-to-peer connection or over the network 106 with the electronic device 110, and/or the server 120).

In one or more implementations, the server 120 provides a remote data storage for storing data associated with or generated by the electronic device 110 and/or the electronic device 130. It should be appreciated that the electronic device 110, the electronic device 130 and/or server 120 can access and exchange data stored on other devices and/or servers directly (e.g., without network 106) using wireless signals such as near-field communications (NFC), Bluetooth signals, direct WiFi signals, and/or wired connections.

By way of example, FIG. 1 shows an environment 100 in which a user interacts directly with the electronic device 110 using input devices such as the keyboard 142 and the mouse 144 to access and/or manipulate data stored on the electronic device 110, electronic device 130 and/or the server 120 through an application such as a file manager application running on the electronic device 110. In such an environment, the electronic device 110 is the primary device while the server 120 and/or the electronic device 130 are the secondary device.

Figure 2A:
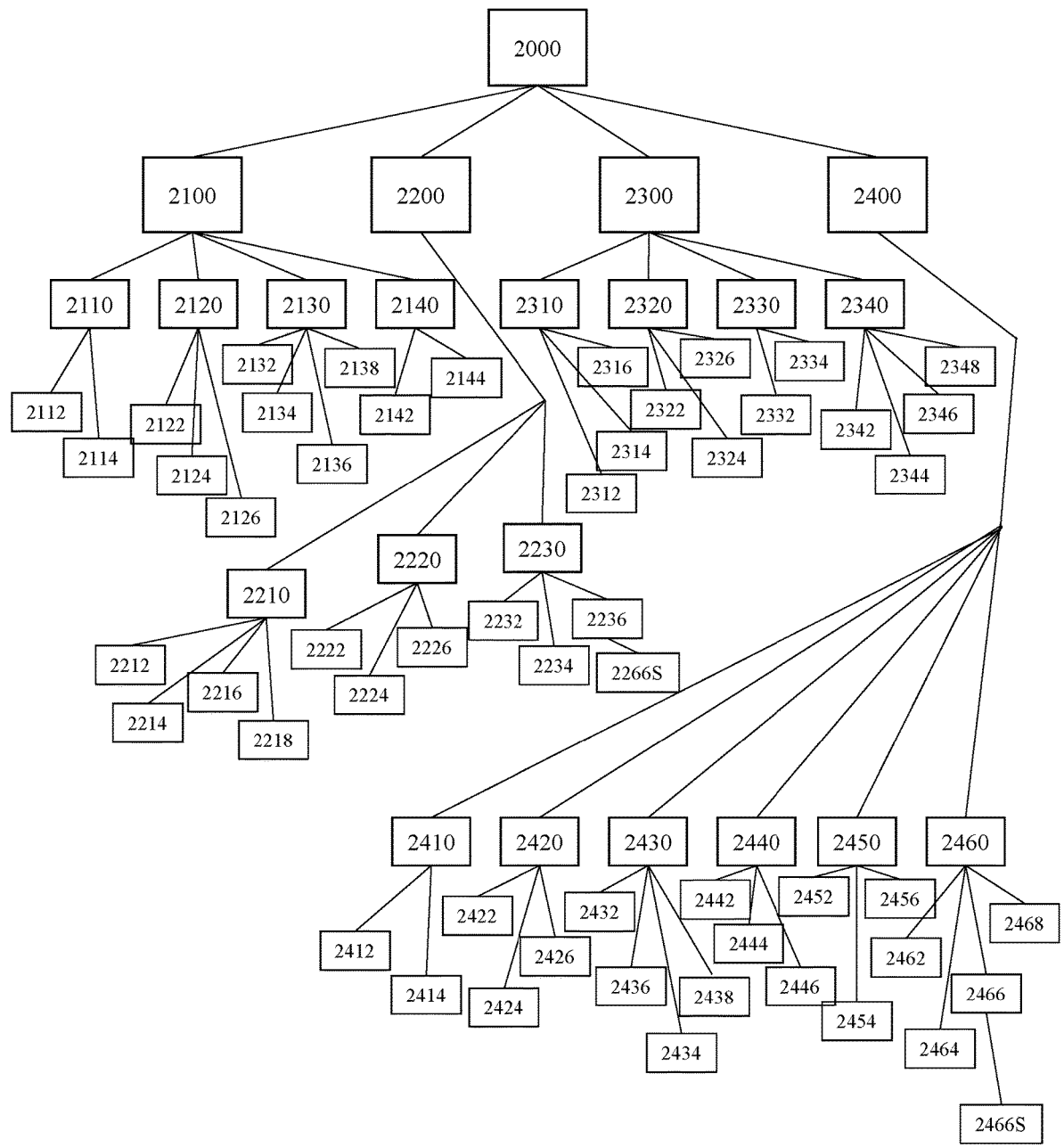
FIG. 2A illustrates an example of a hierarchical content structure in accordance with one or more implementations.

FIG. 2A illustrates an example of a hierarchical content structure in accordance with one or more implementations. In at least some implementations, the hierarchical content structure may be a filesystem wherein the topmost level is designated as the filesystem 2000 and may include various folders corresponding to memory devices 2100, 2200, 2300, 2400 at the next level. In some scenarios, the memory devices associated with folders 2100, 2200 may be local, and memory devices associated folders 2300 and 2400 may be remote memory devices which are accessible via a network to which the electronic device is connected. For example, in implementations where the electronic device 110 is shown in FIG. 1, the folders 2100 and 2200 associated with local memory devices may correspond to hard drives of the electronic device 110, the folder 2300 associated with remote memory device may correspond to a memory device of electronic device 130, and folder 2400 associated with remote memory device may correspond to a hard drive of the server 120.

The next level below the memory devices may include various folders 2110, 2120, 2130, 2140, 2210, 2220, 2230, 2310, 2320, 2330, 2340, 2410, 2420, 2430, 2440, 2450, and 2460 within which subfolders 2112, 2114, 2122, 2124, 2126, 2132, 2134, 2136, 2138, 2142, 2144, 2212, 2214, 2216, 2218, 2222, 2224, 2226, 2232, 2234, 2236, 2312, 2314, 2316, 2322, 2324, 2326, 2332, 2334, 2342, 2344, 2346, 2348, 2412, 2414, 2422, 2424, 2426, 2432, 2434, 2436, 2438, 2442, 2444, 2446, 2452, 2454, 2456, 2462, 2464, 2466 and 2468 may provide a subsequent level. The subfolders may further include additional subfolders therewithin forming subsequent levels, and so forth. It will be appreciated that in many scenarios, there may be several additional levels within each of the subfolders under at least some of these levels, resulting in a complex hierarchical content structure with many levels and sublevels under the topmost level.

Figure 2B:
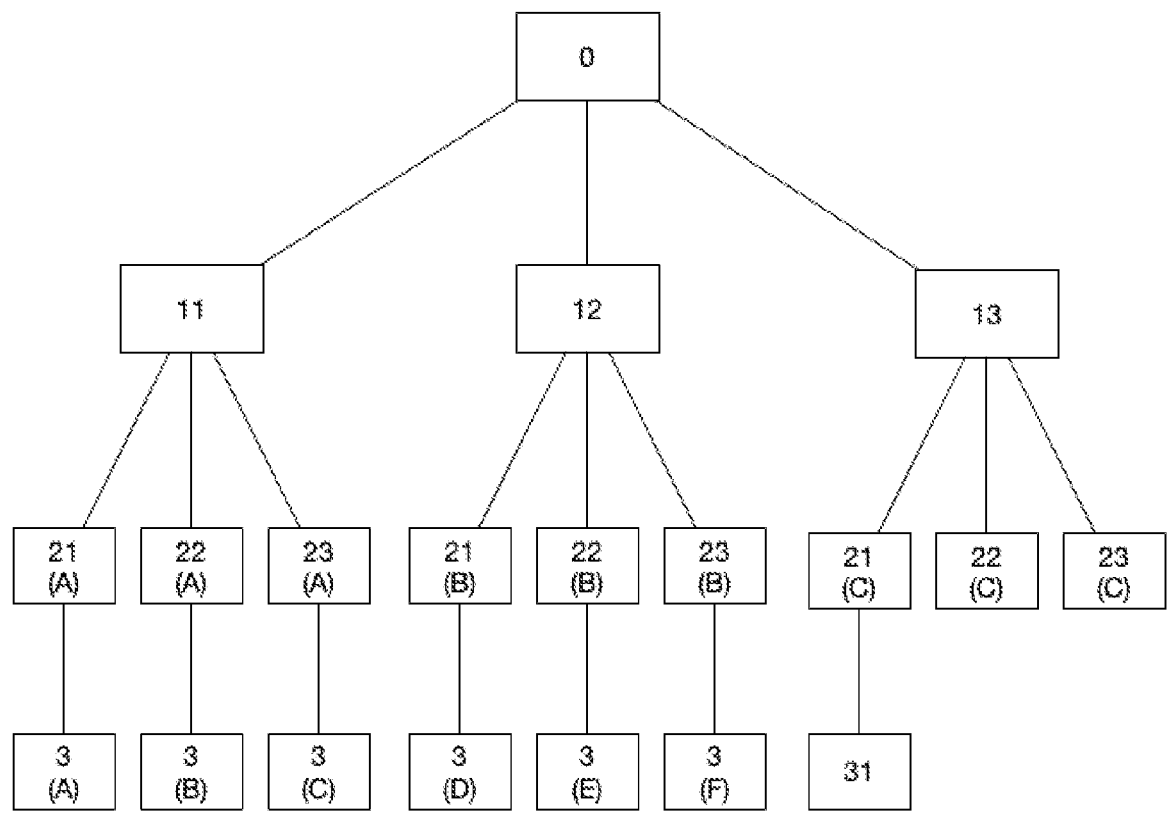
FIG. 2B illustrates another example of a hierarchical content structure in which the names of some of the items are non-unique in accordance with one or more implementations.

FIG. 2B illustrates another example of a hierarchical content structure in which some of the folders have non-unique names in accordance with one or more implementations. In some scenarios, as shown in the hierarchical content structure of FIG. 2B, the topmost level may be the system level "0" which may include folders or memory devices 11, 12 and 13 at the next level. The next level below are folders 21, 22 and 23 in each of the folders or memory devices 11, 12 and 13. In other words, the identifiers for each of the folders within the folders or memory devices 11, 12 and 13 have the same identifiers. In such scenarios, the folders lower in the hierarchy may be distinguished by other means, such as a letter suffix (which may nor may not be visible when viewing the contents of a folder within which such folders reside) such as, for example, (A), (B), . . . , (F). Such disambiguation may, however, be made visible in the navigation bar.

In a typical implementation of a file-manager application, a user can "browse" or navigate through the hierarchical content structure, also referred to herein as the filesystem, on an electronic device, such as the electronic device 110, by sequentially selecting hierarchical levels so as to display the contents of the selected level in the file-manager UI.

For example, for a hierarchical content structure shown in FIG. 2A, the user may be in the file-manager application window, accessing contents in a subfolder 2466S residing within the folder 2466. In this scenario, in order access contents of a subfolder 2236S that resides within 2236, the user has to first move up four levels through 2466, 2460, 2400 to 2000, then move four levels down through 2200, 2230, 2236 and then the subsequent subfolder 2236S. As the hierarchical structure becomes complex with several levels, for example when folders for several projects are created, each having further subfolders based on, for example, years, months and dates, the number of steps for accessing contents of a sublevel that is several levels removed from level being accessed increases substantially, resulting in undue delays in accessing and/or manipulating files on the system.

In order to reduce the time spent moving up and down the hierarchical content structure for accessing and/or manipulating files that are several levels removed within the hierarchical content structure, in some scenarios, it may be desirable to display contents of certain levels of the hierarchical content structure without having to sequentially navigate through different levels of the hierarchical content structure. Thus, the subject technology provides a more effective and efficient method for accessing, navigating through and/or manipulating data within a hierarchical content structure on a device or a set of devices.

The subject technology provides for an interactive navigation bar within an application window showing contents of a given level of a hierarchical content structure associated with an electronic device. For example, the application window may be a UI of a file-manager application and may show contents of subfolder such as any of the subfolders shown in FIG. 2A or 2B. The navigation bar allows a user to display contents of particular levels within the hierarchical content structure in the application window without having to sequentially navigate up and/or down through the hierarchical content structure.

Figure 3:
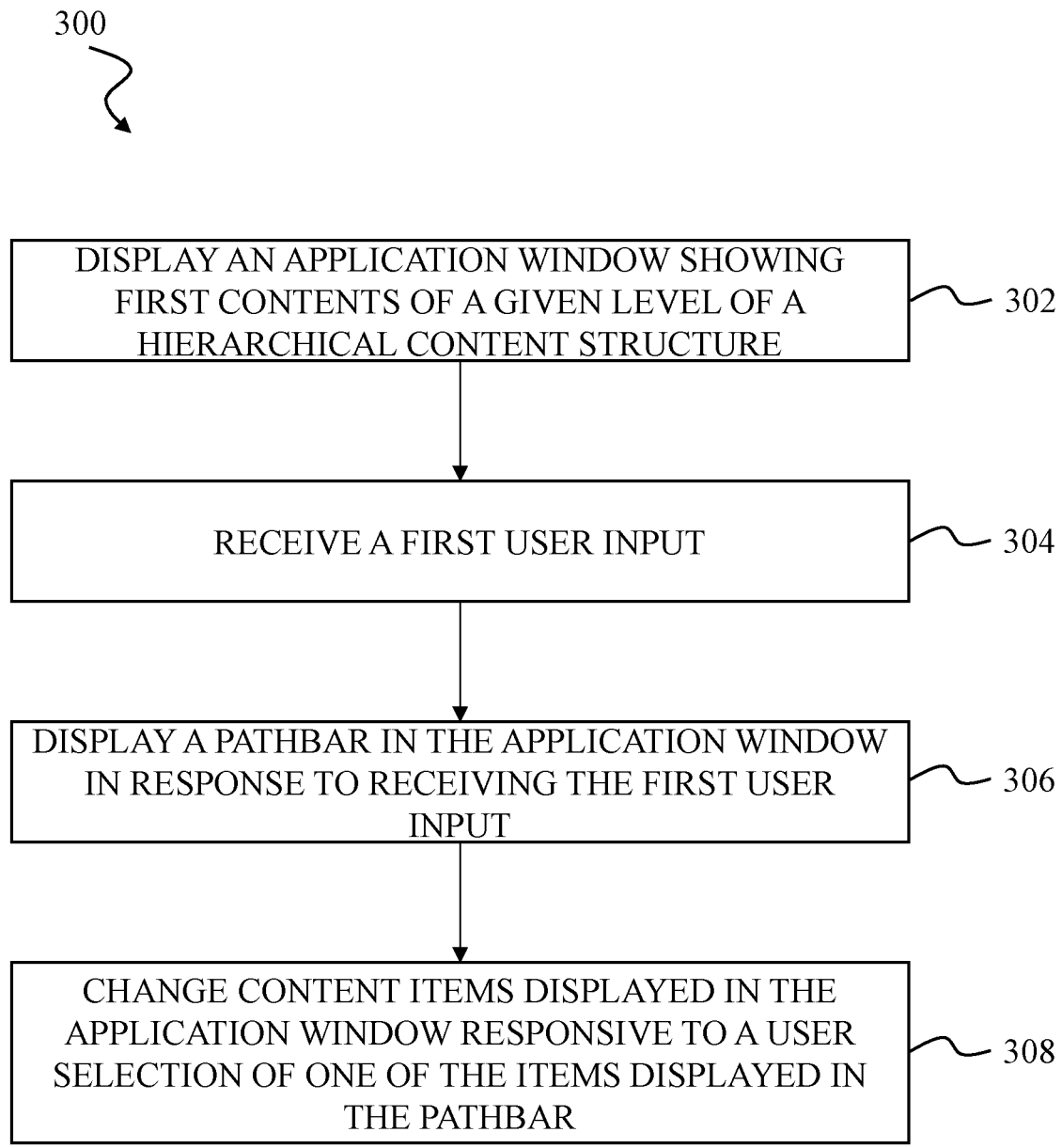
FIG. 3 illustrates a flow diagram of an example process for accessing data stored on an electronic device in a hierarchical content structure in accordance with one or more implementations.
Figure 4:
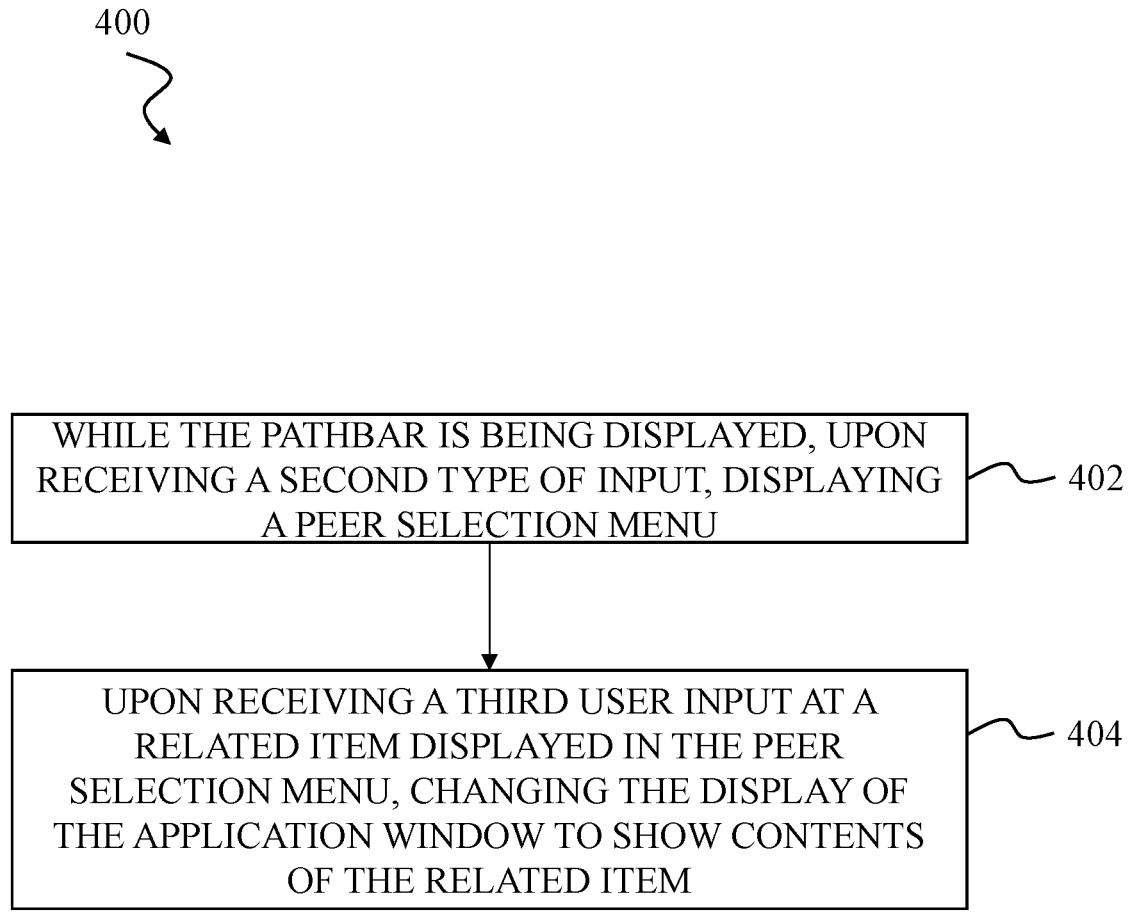
FIG. 4 illustrates a flow diagram of an example process for navigating through a hierarchical content structure for data stored on an electronic device in accordance with one or more implementations.
Figure 5:
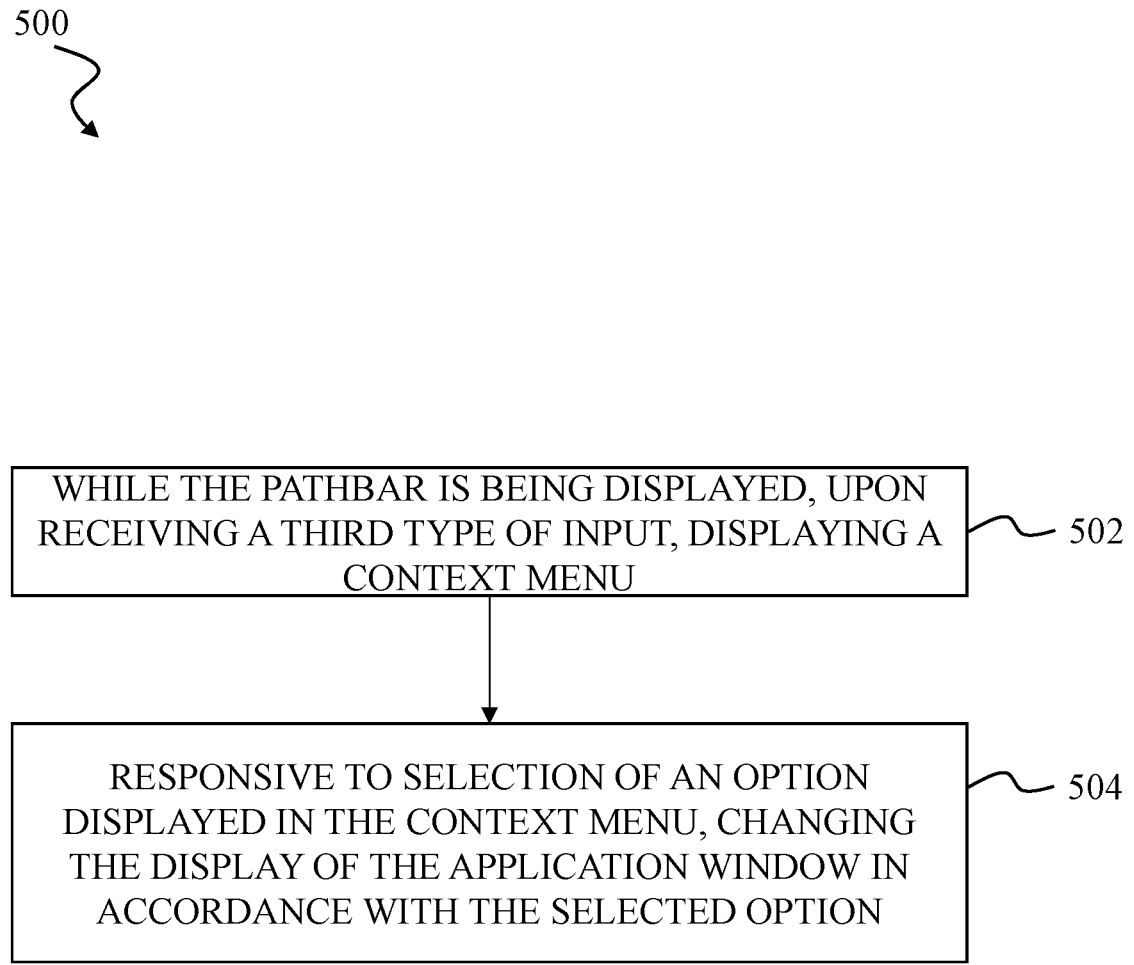
FIG. 5 illustrates a flow diagram of another example process for navigating through a hierarchical content structure for data stored on an electronic device in accordance with one or more implementations.

In accordance with at least some implementations, data in the hierarchical content structure of an electronic device such as the electronic device 110, can be accessed, navigated through and/or manipulated by means of a navigation bar displayed in a UI of, e.g., a file-manager application. FIGS. 3-5 are illustrative examples of a method of accessing data in a hierarchical content structure using a navigation bar in a file-manager application UI. It should be appreciated that the operations described in connection with FIGS. 3-5 can be used to access, navigate through and/or manipulate data stored in hierarchical content structures on remote devices.

FIG. 3 illustrates a flow diagram of an example process 300 performed by an electronic device, such as the electronic device 110, for accessing data stored on an electronic device in a hierarchical content structure such a filesystem. In at least some implementations, the process 300 includes, at 302, displaying an application window (e.g., a user interface of a file-manager application) showing first contents of a given level of a hierarchical content structure associated with the electronic device. For example, the application window may display contents of a subfolder 2236S of the filesystem 2000 shown in FIG. 2. The contents may be displayed as a list of icons corresponding to various items contained in the subfolder.

At 304, a first user input is received. The first user input may be a specific pre-defined input such as, for example, a specific keystroke or a particular gesture on a mouse or a touchpad.

At 306, a navigation bar is displayed in the application window in response to receiving the first user input. In some implementations, the first user input may be persistent for continued display of the navigation bar. For example, a user may hold down a particular key. In at least some implementations, the navigation bar may display a folder hierarchy corresponding to the contents displayed in the window. The navigation bar may include, or display the folder hierarchy based on, information relating to metadata associated with the contents being displayed in the application window, and/or metadata associated with the folder hierarchy displayed in the navigation bar. For example, in the scenario illustrated in FIG. 2A, when a user is viewing contents of a subfolder 2236S within the application window, upon receiving the first user input, the navigation bar may appear and display 2000/2200/2236/2236S. On the other hand, in the scenario illustrated in FIG. 2B, when a user is viewing contents of folder 3(A) within the application window, upon receiving the first user input, the navigation bar may appear and display 0/11/21(A)/3(A). Similarly, when viewing contents of folder 3(F) within the application window, upon receiving the first user input, the navigation bar may appear and display 0/12/23(B)/3(F).

In some implementations, the navigation bar may be ephemeral or temporary in the sense that it is displayed or surfaced only when a user provides the first user input such as, for example, a predetermined keystroke or a mouse gesture, to the electronic device. In some implementations, the navigation bar is displayed as long as the first user input is persistent. For example, the navigation bar is displayed only while the user holds down a particular key. In some implementations, the navigation bar display is maintained while the first user input is persistent, e.g., the user continues to press a particular key on a keyboard and/or the user provides an input indicating that the user is interacting with the navigation bar, e.g., if the user hovers a mouse pointer in the general area of the application window where the navigation bar is displayed while the navigation bar is being displayed. In some implementations, if the user stops providing the first input without interacting with the navigation bar, the navigation bar is hidden so as to increase the viewing space within the application window. In some implementations, the display of the navigation bar is continued if a user interaction is detected such as, for example, if the user provides a second input such as hovering a mouse of a portion of the navigation bar or clicking a portion of the navigation bar. When the user stops providing the second input without further interacting with the navigation bar, the navigation bar is hidden so as to increase the viewing space within the application window.

At 308, in response to a user selection of one of the levels displayed in the navigation bar with a first type of input, the display in the application window is changed to display items contained within the selected level. For example, in the scenario where the user is viewing the contents of a subfolder 2236S, receiving the first user input from the user causes the navigation bar to appear and display 2000/2200/2236/2236S. Subsequently, if the user selects 2200, via a first type of input, the display in the application window is changed to display the contents of 2200, i.e., 2210, 2220, and 2230. The user can then select any one of these levels to display contents therewithin. The first type of input is not particularly limited and may be a single input from a single input device such a designated keystroke, a combined input from a single input device such as a combination of two designated keystrokes, or a combined input from two separate input devices such as a designated keystroke in combination with an input from the mouse.

FIG. 4 illustrates a flow diagram of an example process 400 performed by an electronic device, such as the electronic device 110, for navigating through a hierarchical content structure for data stored on an electronic device in accordance with one or more implementations. In some implementations, the process 400 follows 306 of process 300, The description for the common portions of process 300 and process 400 is, therefore, omitted for brevity.

In some implementations, process 400 includes, at 402, while the navigation bar is being displayed upon receiving a second type of input, displaying a peer selection menu. In one or more implementations, the second type of input is different from the first type of input but is not otherwise limited. As with the first type of input, the second type of input may be a single input from a single input device such a designated keystroke (that is different from that of the first type of input), a combined input from a single input device such as a combination of two designated keystrokes (at least one of which is different from that of the first type of input), or a combined input from two separate input devices such as a designated keystroke in combination with an input from the mouse (at least one of the keystroke and the mouse input being different from the first type of input).

Figure 6:
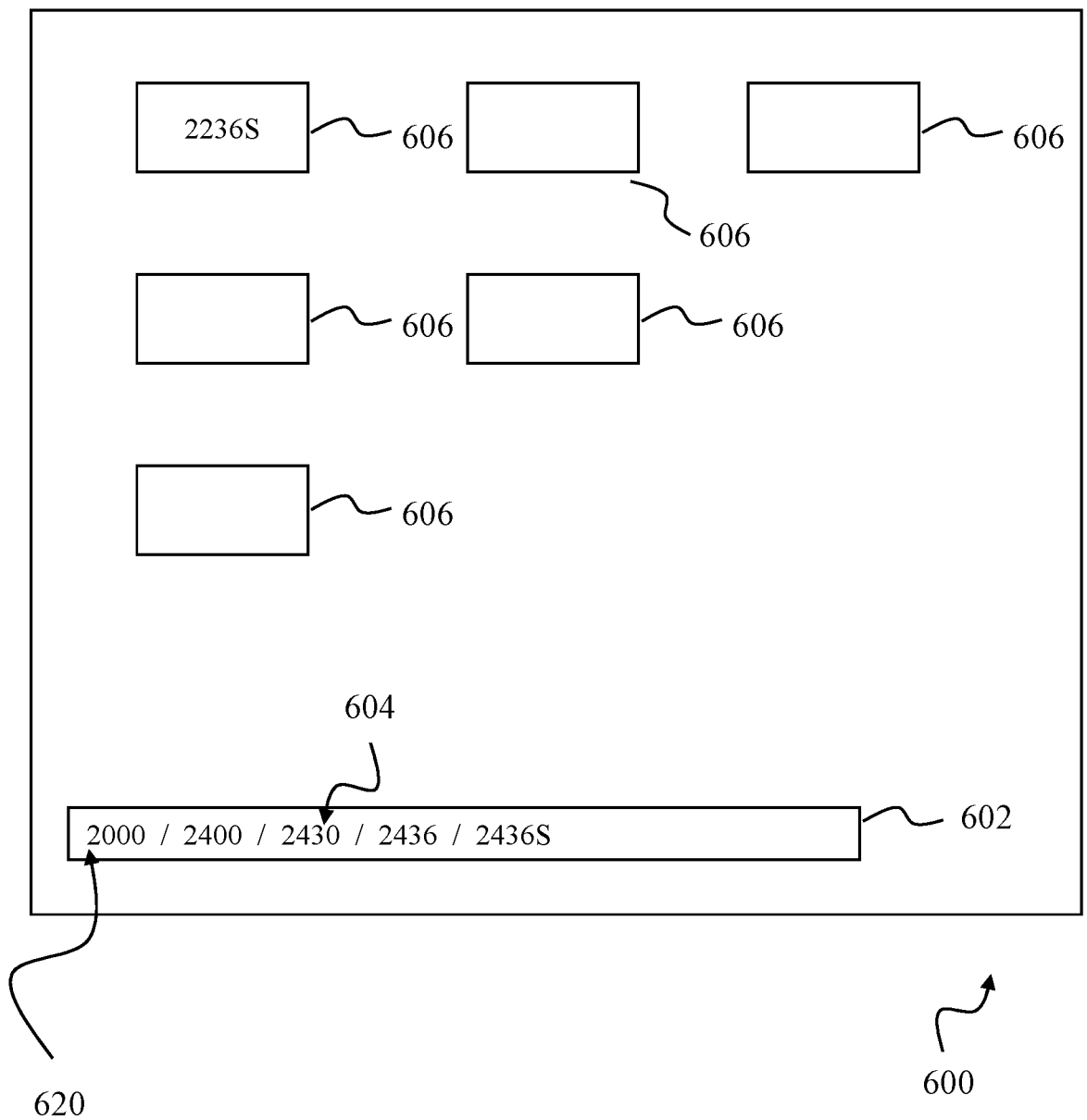
FIG. 6 illustrates a schematic diagram showing an exemplary user interface view for a navigation bar in an application window for accessing data stored on an electronic device in a hierarchical content structure in accordance with one or more implementations.

The peer selection menu may display folders in the hierarchical content structure at the same level of hierarchy as the selected folder. For example, as illustrated in FIG. 6, in the scenario where the navigation bar displays 2000/2400/2430/2436/2436S, receiving a second type of input at 2400 displays a peer selection menu showing peer folders 2100, 2200 and 2300 alongside (or above and/or below) 2400 within the navigation bar. As used herein, the term "peer folder" refers to a folder at a same level of hierarchy within the hierarchical content structure as the selected folder.

In the scenario where the hierarchical content structure is similar to the one illustrated in FIG. 2B, (i.e., where folder identifiers are non-unique), while viewing the contents of the folder 3(A), the navigation bar displays 0/11/21(A)/3(A). Upon receiving a second type of input at 11, a peer selection menu showing peer folders 12 and 13 alongside (or above or below) 11 is displayed within the navigation bar.

Figure 7:
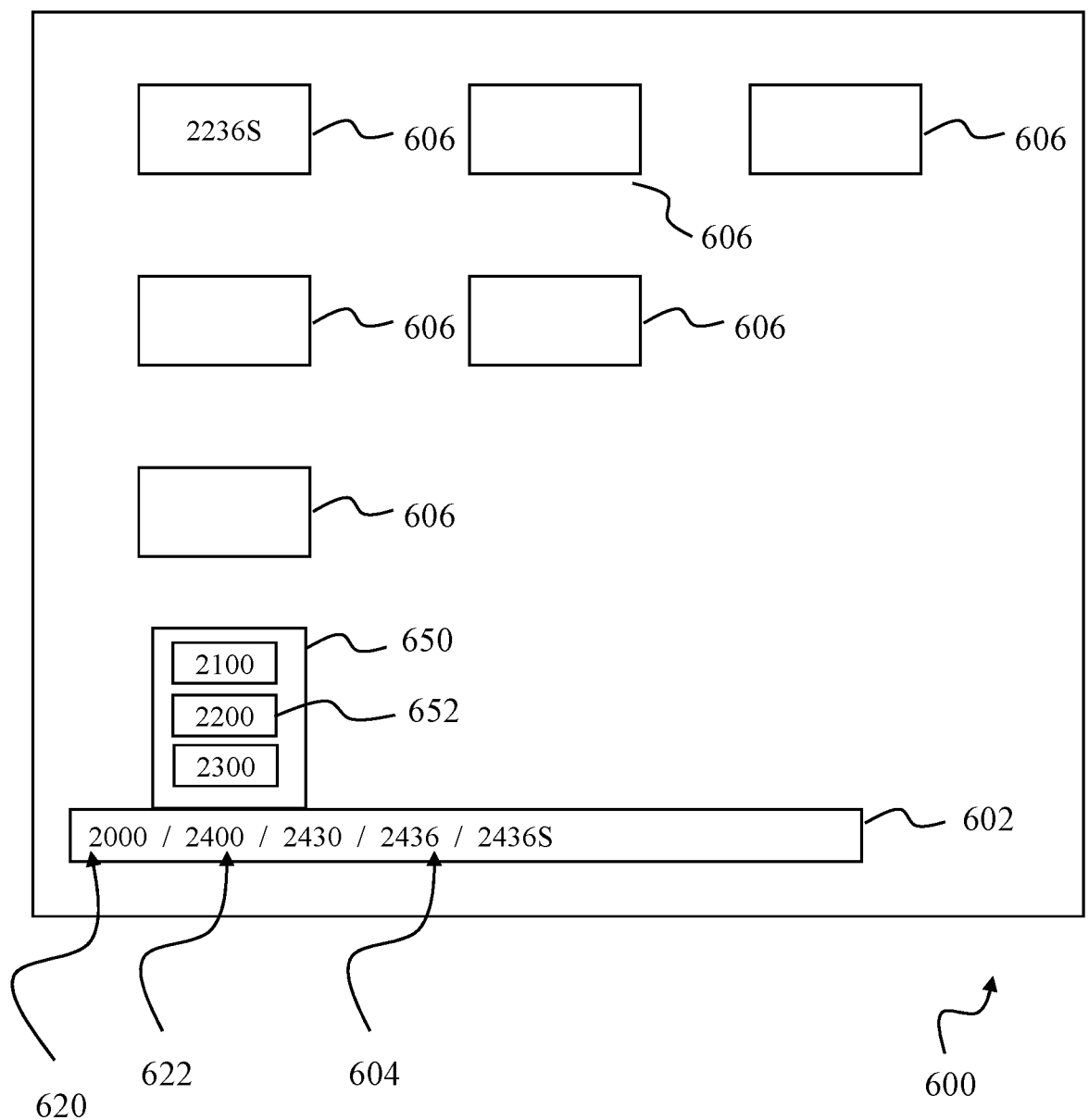
FIG. 7 illustrates a peer-selection menu 650 surfaced in the navigation bar 602 of FIG. 6.

At 404, the display of application window is changed, in response to the user selecting a desired peer folder, to show the contents of the selected level. Thus, in another scenario, as illustrated in FIG. 7, while the navigation bar displays 2000/2400/2430/2436/2436S, receiving a second type of input at 2436 displays a peer selection menu showing peer folders 2432, 2434 and 2438. Upon selection of one of the desired peer folders, the display of the application window is changed to show corresponding content items from the selected peer folder in the application window. At the same time, the navigation bar is updated to show the corresponding path.

Alternatively or additionally, in some implementations, the display of application window is changed, in response to the user providing a subsequent input (e.g., a third type of input) at a desired peer folder, to show the contents of the a folder having a path through the hierarchy with a common suffix. For example, in the scenario where the navigation bar displays 0/11/21(A)/3(A), upon receiving a second type of input at 11, a peer selection menu showing folders 11, 12, and 13 is displayed. A subsequent input received at, e.g., peer folder 12 (where a path with a common suffix down a same level as the currently displayed level exists), causes the display of the application window to be changed to show the contents of 3(D) and updating the navigation bar to show 0/12/21(B)/3(D).

In contrast, where the path through hierarchy does not have a common suffix, receipt of the subsequent input causes the display of the application window to be changed to show the contents of the folder at which the subsequent input is received. For example, in the scenario where the navigation bar displays 0/11/21(A)/3(A), upon receiving a second type of input at 11, a peer selection menu showing folders 11, 12, and 13 is displayed. A subsequent input received at, e.g., peer folder 13 (where a path with a common suffix down a same level as the currently displayed level does not exist), causes the display of the application window to be changed to show the contents of 13. Alternatively or additionally (e.g., upon receipt of a different type of subsequent input), the display of the application window may be caused to change to show the next closest comment path suffix of 21(C).

In some implementations, the peer selection menu may be further expanded to show a nested peer selection menu. For example, in yet another scenario, while the navigation bar displays 2000/2400/2430/2436/2436S, receiving a second type of input at 2400 displays a peer selection menu showing peer folders 2100, 2200 and 2300. If a subsequent second type of input is received at one of the peer folders, e.g., 2200, a nested peer selection menu showing contents of the selected peer folder 2200 within the navigation bar (rather than in the application window) are shown one of which can then be selected to show the contents therewithin in the application window. For example, receiving a subsequent second type of input at 2200 within a peer selection menu showing peer folders 2100, 2200 and 2300, displays the nested peer selection menu showing 2210, 2220 and 2230, and selecting 2230 can then cause the application window to display the contents of 2230, i.e., 2232, 2234 and 2236. Thus, a user can change the contents displayed in the application window from those of a subfolder 2436S to those of folder 2236 from within the navigation bar rather than having to move up the hierarchy to 2430, 2400, 2000, and then move down the hierarchy to 2200, 2230 and then 2236.

Thus, advantageously, a user can access or navigate to contents of a folder several levels away from the presently displayed contents within the hierarchical content structure using the navigation bar, and in particular, using the peer selection menu of the navigation bar.

FIG. 5 illustrates a flow diagram of an example process 500 performed by an electronic device, such as the electronic device 110, for navigating through a hierarchical content structure for data stored on an electronic device in accordance with one or more implementations. In some implementations, the process 500 follows 306 of process 300. The description for the common portions of process 300 and process 500 is, therefore, omitted for conciseness.

In some implementations, process 500 includes, at 502, while the navigation bar is being displayed upon receiving a third type of input, displaying a context menu. The third type of input may be different from the first and second types of input but is not otherwise limited. As with the first or second types of inputs, the third type of input may be a single input from a single input device such a designated keystroke (that is different from that of the first or second types of inputs), a combined input from a single input device such as a combination of two designated keystrokes (at least one of which is different from that of the first or second types of inputs), or a combined input from two separate input devices such as a designated keystroke in combination with an input from the mouse (at least one of the keystroke and the mouse input being different from the first or second types of inputs).

The context menu, in some implementations, includes a list of actions that can be taken by a user corresponding to the selected folder. In some implementations, the context menu may include one or more selectable user interface elements corresponding to one or more of: an option for navigating to the selected location and displaying contents of the selected location within a new application window; an option to copy the path displayed in the navigation bar; an option to display metadata associated with the selected location; and an option for navigating to a location immediately higher in hierarchy than the selected location and displaying contents of the higher location within the application window. In some implementations, the context menu may be based on the metadata associated with the selected folder.

For example, in some scenarios, a given folder may have restricted access based on permissions set by a device administrator or by the operating system running on the electronic device. In such scenarios, some of the possible options may not be presented in the context menu. As another example, in some scenarios, the context menu may include an option to open the selected file using a selected set of software applications. In a further example, in some scenarios, the context menu may include an option to scan the folder for malicious content. As such the options that may be included in the context menu are not particularly limited, and may include other options depending on the file type, content type, content size, or any other parameter.

Referring back to FIG. 5, at 504, the display of application window is changed, in response to the user selecting an option presented in the context menu. For example, in some implementations, the context menu may provide an option to display the contents of the selected folder in a new application window. Thus, at 504, upon receiving a selection of such an option from the user, a new application window displaying the contents of the selected folder may be launched.

FIG. 6 illustrates an application window 600 for a file-manager application that may be displayed by an electronic device, such as the electronic device 110, in which a navigation bar in accordance with some implementations is provided. In the example of FIG. 6, a user has held the 'command' key (or any key) on the keyboard to surface the navigation bar 602 on the application window 600, which also displays contents of folder 604 as icons 606. The navigation bar 602 displays the path 620 to arrive at the folder 604 with a hierarchical content structure.

FIG. 7 illustrates a peer-selection menu 650 surfaced in the navigation bar 602 of FIG. 6. In FIG. 7, while the navigation bar 602 is being displayed, the user has held, for example, the 'all' key (or any key) on the keyboard and clicked on one of the folders 622 in the path 620 using the mouse to surface the peer selection menu 650. The peer selection menu 650 includes a list of peer folders 652 that are at the same hierarchical level as the folder 622. The user may then click on any one of the peer folders 652 to display the contents of that folder in the application window 600 as icons 656.

Figure 8:
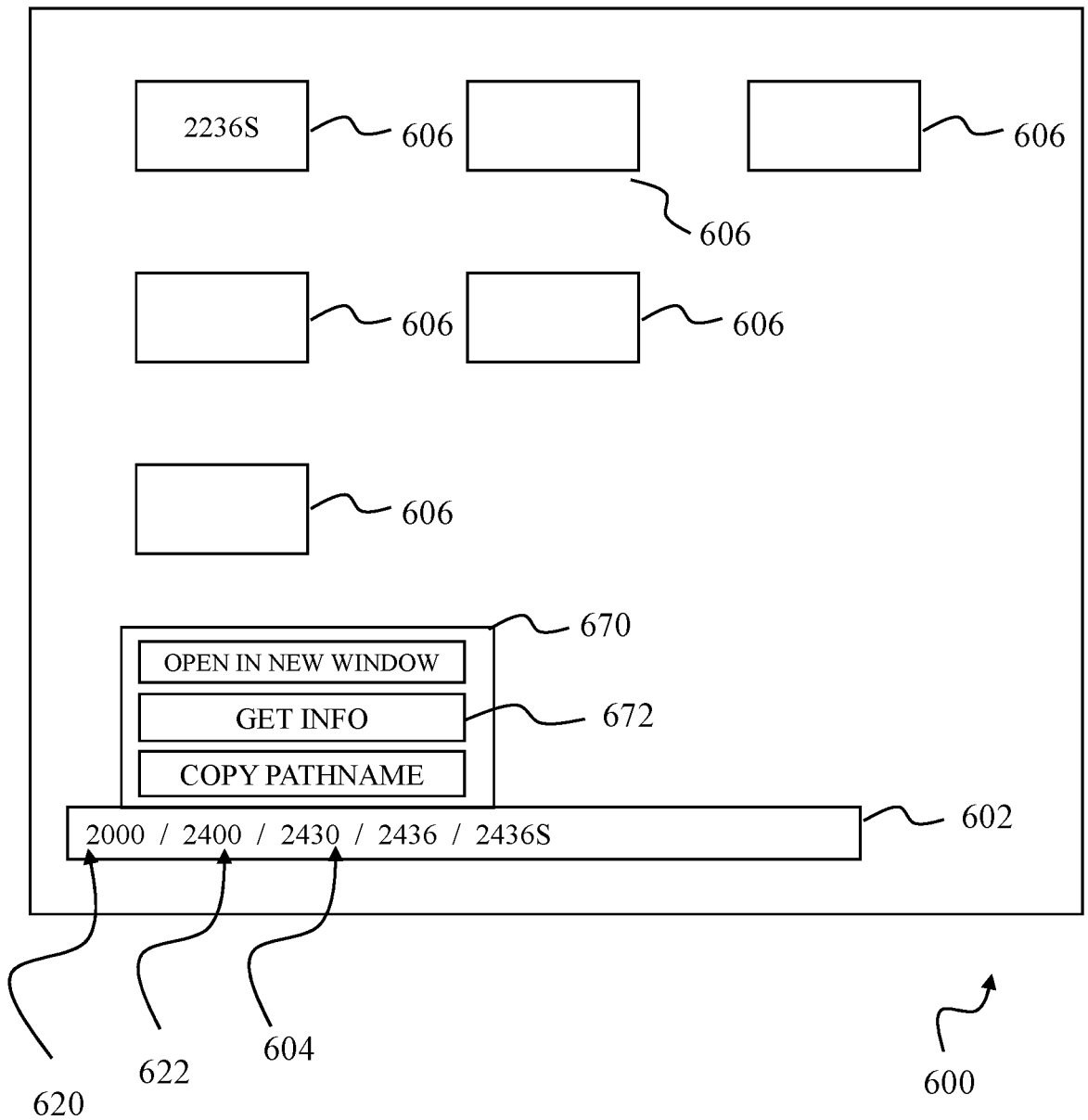
FIG. 8 illustrates a context menu 670 surfaced in the navigation bar 602 of FIG. 6.

FIG. 8 illustrates a context menu 670 surfaced in the navigation bar 602 of FIG. 6. In FIG. 8, while the navigation bar 602 is being displayed, the user has right-clicked on one of the folders 622 in the path 620 using the mouse to surface the context menu 670. The context menu 670 includes a list of options 672 for the user to select based on the metadata associated with the folder 622. The user may then click on any one of the options 672 to take specified actions relating to the folder 622.

As described above, one aspect of the present technology is to provide an interactive, ephemeral navigation bar in an application window to enable a user to reduce the number of steps while navigating a hierarchical content structure. The navigation bar may show a path for arriving at the folder, contents of which are being displayed in the application window, within the hierarchical structure.

A user may have several types of interactions with the navigation bar. In one interaction, upon receiving a first type of input from the user at a folder displayed in the navigation bar, display in the application window is changed to show contents of the interacted folder, thereby reducing the number of steps the user has to perform to arrive at those contents within the hierarchical structure.

In another interaction, upon receiving a second type of input from the user at a folder displayed in the navigation bar, a peer selection menu including folders at the same level of hierarchy as the interacted folder is displayed. Further, upon receiving a selection of a folder from the user from among the folders displayed in the peer selection menu, display in the application window is changed to show contents of the selected folder, thereby reducing the number of steps the user has to perform to display the contents of the selected folder. Alternatively or additionally, upon receiving a selection of a folder from the user from among the folders displayed in the peer selection menu, display in the application window is changed to show contents of a folder within the selected folder having a same level of hierarchy as the currently displayed folder and a common path suffix (or a next closest common path suffix), thereby further reducing the number of steps the user has to perform to display the contents of a common path suffix folder. Thus, using the peer selection menu in the navigation bar further reduces processor activity by avoiding the change of display associated with each step of moving through the hierarchy by way of moving up the hierarchy and then moving back down to arrive at the desired folder.

In yet another interaction, upon receiving a third type of input from the user at a folder displayed in the navigation bar, a context menu including options associated with the interacted folder upon which a user can act is displayed. Further, upon receiving a selection of an option from the user among the options displayed in the content menu, display of the application window is changed in accordance with the selected option.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of accessing content or other data from a remote device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use and/or access of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, insertion of content or other data from a remote device can be performed based on non-personal information data or a bare minimum amount of personal information, such as the content being requested by the device associated with a user, other non-personal information available to the application obtaining the content or other data, or publicly available information.

Figure 9:
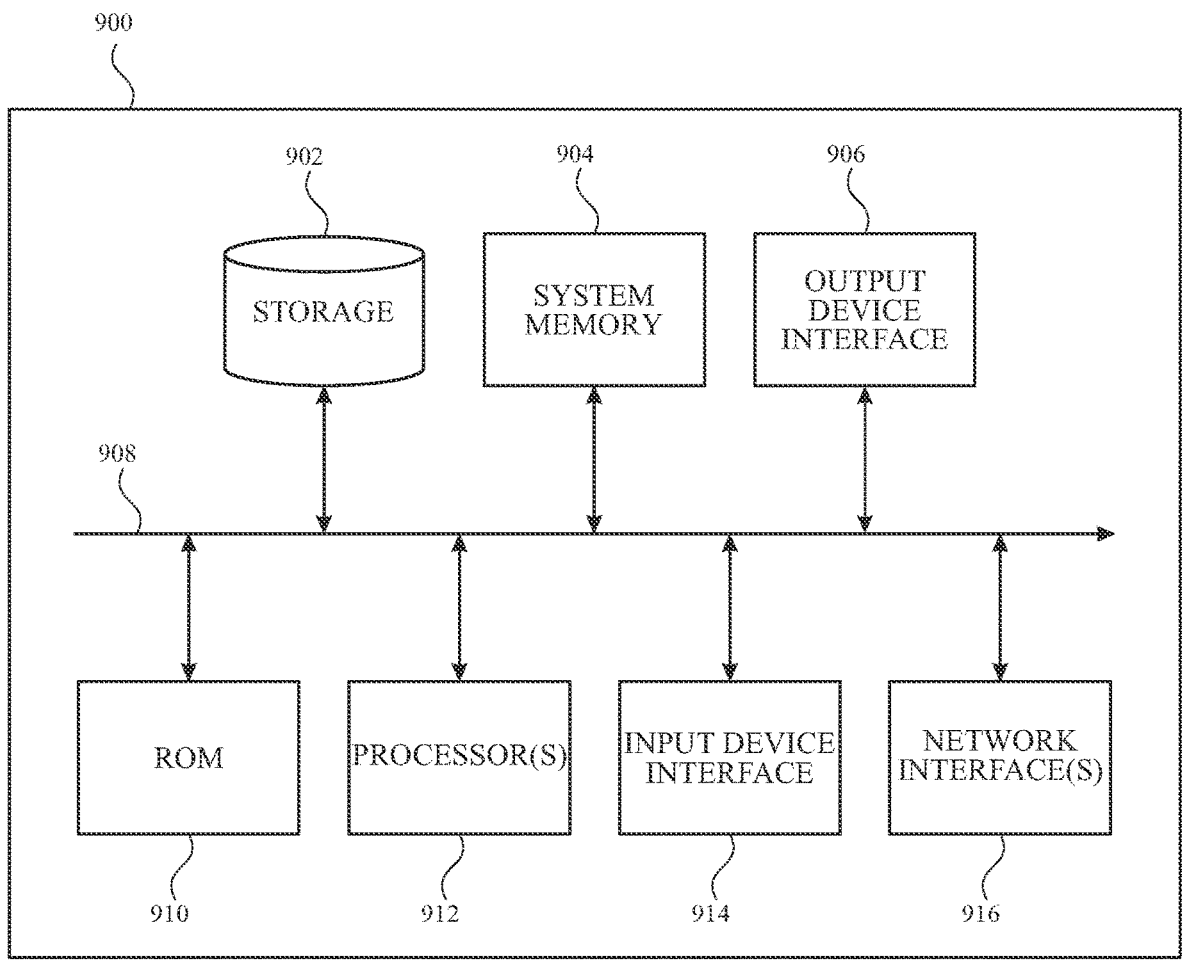
FIG. 9 illustrates an electronic system with which one or more implementations of the subject technology may be implemented.

FIG. 9 illustrates an electronic system 900 with which one or more implementations of the subject technology may be implemented. The electronic system 900 can be, and/or can be a part of, the electronic device 110, the electronic device 130, and/or the server 120 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 1016, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

In accordance with various aspects of the subject disclosure, a method for accessing, navigating through and/or manipulating data within a hierarchical content structure may include displaying an application window showing first contents of a given level of a hierarchical content structure associated with an electronic device; receiving a first user input; displaying in the application window, in response to receiving the first user input, a navigation bar displaying a path including levels for arriving at the first contents within the hierarchical content structure, the displayed path being determined based on metadata associated with contents displayed in the application window; changing, responsive to a user selection of one of the items of the hierarchical content structure displayed in the navigation bar, content items displayed in the application window; and while the navigation bar is being displayed, in response to a third predetermined user input at the selected item of the hierarchical content structure displayed on the navigation bar, displaying a peer selection menu displaying related items at a same level of hierarchy as the selected item within the hierarchical content structure.

In accordance with various aspects of the subject disclosure, a non-transitory computer-readable medium is provided that includes instructions, which when executed by at least one computing device, cause the at least one computing device to perform operations including displaying an application window showing first contents of a given level of a hierarchical content structure associated with an electronic device; receiving a first user input; displaying in the application window, in response to receiving the first user input, a navigation bar displaying a path including levels for arriving at the first contents within the hierarchical content structure, the displayed path being determined based on metadata associated with contents displayed in the application window; changing, responsive to a user selection of one of the items of the hierarchical content structure displayed in the navigation bar, content items displayed in the application window; and while the navigation bar is being displayed, in response to a third predetermined user input at the selected item of the hierarchical content structure displayed on the navigation bar, displaying a peer selection menu displaying related items at a same level of hierarchy as the selected item within the hierarchical content structure.

In accordance with various aspects of the subject disclosure, a device is provided that includes a memory and at least one processor communicatively coupled to the memory. The at least one processor is configured to display an application window showing first contents of a given level of a hierarchical content structure associated with an electronic device; receive a first user input; display in the application window, in response to receiving the first user input, a navigation bar displaying a path including levels for arriving at the first contents within the hierarchical content structure, the displayed path being determined based on metadata associated with contents displayed in the application window; change, responsive to a user selection of one of the items of the hierarchical content structure displayed in the navigation bar, content items displayed in the application window; and while the navigation bar is being displayed, in response to a third predetermined user input at the selected item of the hierarchical content structure displayed on the navigation bar, display a peer selection menu displaying related items at a same level of hierarchy as the selected item within the hierarchical content structure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   a memory; and
   at least one processor communicatively coupled to the memory and configured to:
   receive a user request to display an application window showing first contents of a given level of a hierarchical content structure associated with an electronic device;
   responsive to receipt of the user request, display, without a navigation bar, the application window showing first contents of the given level of the hierarchical content structure associated with the device;
   receive a first user input while the application window is being displayed without the navigation bar;
   display in the application window, in response to receiving the first user input, a navigation bar displaying a path including levels for arriving at the first contents within the hierarchical content structure, the displayed path being determined based on metadata associated with contents displayed in the application window; and change, responsive to a user selection of an item of the hierarchical content structure displayed in the navigation bar, content items displayed in the application window.

2. The device of claim 1, wherein the at least one processor is further configured to change the content items displayed in the application window, responsive to the user selection, to display second contents of the selected item of the hierarchical content structure.

3. The device of claim 1, wherein the at least one processor is further configured to fix a position and display of the navigation bar in the application window in response to receipt of a second user input.

4. The device of claim 1, wherein the at least one processor is further configured to display, while the navigation bar is being displayed, responsive to a third user input at the selected item displayed on the navigation bar, a context menu including a set of possible actions relating to the selected item, a set of possible items relating to the selected item being determined based on the metadata associated with the selected item.

5. The device of claim 4, wherein the context menu comprises one or more of the following: an option for navigating to the selected item and displaying contents of the selected item within the application window; an option for navigating to the selected item and displaying contents of the selected item in a new application window; an option to copy the path displayed in the navigation bar; an option to display metadata associated with the selected item; an option to quarantine and/or restrict access to contents of the selected item; and an option for navigating to an item immediately higher in hierarchy than the selected item and displaying contents of the immediately higher item in the application window.

6. A non-transitory computer-readable medium comprising instructions, which when executed by at least one computing device, cause the at least one computing device to perform operations comprising:
receiving a user request to display an application window showing first contents of a given level of a hierarchical content structure associated with an electronic device;
responsive to receiving the user request, displaying, without a navigation bar, the application window showing first contents of the given level of the hierarchical content structure associated with the electronic device;
receiving a first user input while the application window is being displayed without the navigation bar;
displaying in the application window, in response to receiving the first user input, a navigation bar displaying a path including levels for arriving at the first contents within the hierarchical content structure, the displayed path being determined based on metadata associated with contents displayed in the application window;
changing, responsive to a user selection of an item of the hierarchical content structure displayed in the navigation bar, content items displayed in the application window; and
while the navigation bar is being displayed, in response to a third user input at the selected item of the hierarchical content structure displayed on the navigation bar, displaying a peer selection menu displaying related items at a same level of hierarchy as the selected item within the hierarchical content structure.

7. The non-transitory computer-readable medium of claim 6, wherein changing content items displayed in the application window comprises changing the content items displayed in the application window to display second contents of the selected item of the hierarchical content structure.

8. The non-transitory computer-readable medium of claim 6, wherein the operations further comprise fixing a position and display of the navigation bar in the application window in response to receipt of a second user input.

9. The non-transitory computer-readable medium of claim 6, wherein the operations further comprise changing the content items displayed in the application window, responsive to a user selection of one of the related items displayed in the peer selection menu, to display third contents of the selected related item of the hierarchical content structure.

10. The non-transitory computer-readable medium of claim 6, wherein the operations further comprise displaying, while the peer selection menu is being displayed, responsive to the third user input at a selected related item displayed in the peer selection menu, a nested peer selection menu displaying further related items at a same level of hierarchy as the selected related item within the hierarchical content structure.

11. The non-transitory computer-readable medium of claim 6, wherein the operations further comprise displaying, while the navigation bar is being displayed, responsive to a fourth user input at the selected item displayed on the navigation bar, a context menu including a set of possible actions relating to the selected item, a set of possible items relating to the selected item being determined based on the metadata associated with the selected item.

12. The non-transitory computer-readable medium of claim 11, wherein the context menu comprises one or more of the following: an option for navigating to the selected item and displaying contents of the selected item within the application window; an option for navigating to the selected item and displaying contents of the selected item in a new application window; an option to copy the path displayed in the navigation bar; an option to display metadata associated with the selected item; an option to quarantine and/or restrict access to contents of the selected item; and an option for navigating to an item immediately higher in hierarchy than the selected item and displaying contents of the immediately higher item in the application window.

13. The non-transitory computer-readable medium of claim 6, wherein the application window excludes any navigation bar when the user input is received.

14. The non-transitory computer-readable medium of claim 13, wherein the navigation bar is displayed while the first user input is persistent and the navigation bar is hidden when the first user input is no longer persistent.

15. A method comprising:
receiving a user request to display an application window showing first contents of a given level of a hierarchical content structure associated with an electronic device;
responsive to receiving the user request, displaying, without a navigation bar, application window showing first contents of the given level of the hierarchical content structure associated with the electronic device;
receiving a first user input while the application window is being displayed without the navigation bar;
displaying in the application window, in response to receiving the first user input, a navigation bar displaying a path including levels for arriving at the first contents within the hierarchical content structure, the displayed path being determined based on metadata associated with contents displayed in the application window;

changing, responsive to a user selection of an item of the hierarchical content structure displayed in the navigation bar, content items displayed in the application window; and while the navigation bar is being displayed, in response to a third user input at the selected item of the hierarchical content structure displayed on the navigation bar, displaying a peer selection menu displaying related items at a same level of hierarchy as the selected item within the hierarchical content structure.

16. The method of claim 15, wherein changing content items displayed in the application window comprises changing the content items displayed in the application window to display second contents of the selected item of the hierarchical content structure.

17. The method of claim 15, further comprising fixing a position and display of the navigation bar in the application window in response to receipt of a second user input.

18. The method of claim 15, further comprising changing the content items displayed in the application window, responsive to a user selection of one of the related items displayed in the peer selection menu, to display third contents of the selected related item of the hierarchical content structure.

19. The method of claim 15, further comprising displaying, while the peer selection menu is being displayed, responsive to the third user input at a selected related item displayed in the peer selection menu, a nested peer selection menu displaying further related items at a same level of hierarchy as the selected related item within the hierarchical content structure.

20. The method of claim 15, further comprising displaying, while the navigation bar is being displayed, responsive to a fourth user input at the selected item displayed on the navigation bar, a context menu including a set of possible actions relating to the selected item, a set of possible items relating to the selected item being determined based on the metadata associated with the selected item, wherein the context menu comprises one or more of the following: an option for navigating to the selected item and displaying contents of the selected item within the application window; an option for navigating to the selected item and displaying contents of the selected item in a new application window; an option to copy the path displayed in the navigation bar; an option to display metadata associated with the selected item; an option to quarantine and/or restrict access to contents of the selected item; and an option for navigating to an item immediately higher in hierarchy than the selected item and displaying contents of the higher item in the application window.

* * * * *

UNITED STATES PATENT AND TRADEMARK OFFICE
CERTIFICATE OF CORRECTION

PATENT NO. : 11,954,303 B2
APPLICATION NO. : 17/739073
DATED : April 9, 2024
INVENTOR(S) : Kim Hunter et al.

It is certified that error appears in the above-identified patent and that said Letters Patent is hereby corrected as shown below:

In the Claims

Column 18; Line No. 56 (Claim 15): "bar, application" should read --bar, the application--.

Signed and Sealed this
Eighteenth Day of June, 2024

Katherine Kelly Vidal
*Director of the United States Patent and Trademark Office*